(12) United States Patent
Richardson

(10) Patent No.: US 6,842,553 B2
(45) Date of Patent: Jan. 11, 2005

(54) METHOD FOR CROSS-CONNECTING OPTICAL SIGNALS AT HIGH SPEED

(75) Inventor: Douglas Richardson, Port Moudy (CA)

(73) Assignee: Creo SRL, Burnaby (CA)

( * ) Notice: Subject to any disclaimer, the term of this patent is extended or adjusted under 35 U.S.C. 154(b) by 53 days.

(21) Appl. No.: 09/835,543

(22) Filed: Apr. 17, 2001

(65) Prior Publication Data

US 2002/0150327 A1 Oct. 17, 2002

(51) Int. Cl.[7] .............................. G02B 6/26; G02B 6/42
(52) U.S. Cl. ............................ 385/17; 385/16; 385/18
(58) Field of Search ............................ 385/16–18, 25, 385/26, 30–39, 43–48; 349/16–19

(56) References Cited

U.S. PATENT DOCUMENTS

| | | | |
|---|---|---|---|
| 4,153,329 A | | 5/1979 | Gillette |
| 4,580,873 A | | 4/1986 | Levinson |
| 4,856,863 A | | 8/1989 | Sampsell et al. |
| 5,255,332 A | * | 10/1993 | Welch et al. ................. 385/17 |
| 5,498,868 A | * | 3/1996 | Nishikawa et al. ........... 53/221 |
| 5,751,420 A | * | 5/1998 | Iida et al. .................... 356/328 |
| 5,877,876 A | | 3/1999 | Birdwell |
| 5,960,132 A | | 9/1999 | Lin |
| 5,999,303 A | | 12/1999 | Drake |
| 6,072,923 A | | 6/2000 | Stone |
| 6,097,859 A | | 8/2000 | Solgaard et al. |
| 6,188,525 B1 | * | 2/2001 | Silver ......................... 359/665 |
| 6,317,190 B1 | * | 11/2001 | Winarski et al. ............ 349/200 |
| 6,396,976 B1 | * | 5/2002 | Little et al. ................... 385/18 |
| 6,411,753 B1 | * | 6/2002 | Ao .............................. 385/17 |
| 6,430,333 B1 | * | 8/2002 | Little et al. ................... 385/18 |
| 6,453,083 B1 | | 9/2002 | Husain et al. |
| 6,493,479 B1 | * | 12/2002 | Briggs ......................... 385/17 |

* cited by examiner

Primary Examiner—Robert H. Kim
Assistant Examiner—Richard H Kim
(74) Attorney, Agent, or Firm—Oyen Wiggs Green & Mutala

(57) ABSTRACT

A micro-machined mirror optical crossbar switch directs the light beams of input signal channels to selected output channels by manipulating the focal lengths of adaptive optical elements to ensure that the light beam of any given incoming channel is always focused at the position of the reflective device that is selected to switch that beam. This allows the reflective device to be smaller and switch faster and allows the number of output channels per input channel to be increased.

34 Claims, 2 Drawing Sheets

METHOD FOR CROSS-CONNECTING OPTICAL SIGNALS AT HIGH SPEED

FIELD OF THE INVENTION

The invention to the field of optical communication and in particular to the cross-connection of optical communication channels.

BACKGROUND OF THE INVENTION

The field of communications has benefited enormously from the introduction of optical communications technology. Fundamentally, this technology exploits the inherent bandwidth potential of the light itself as a carrier. As this technology natures, the need for the direct optical processing of signals is becoming greater. Much of the communications infrastructure in operation in the field relies on optical signals being converted back to electrical form for certain processing and management functions. Direct optical processing has the benefit of avoiding the need for such conversion with its associated costs, losses and amplification requirements.

One of the fundamental building blocks of an optical communications system is the optical cross-connect or optical crossbar switch. These devices function to selectably connect any one of an array of incoming optical signals to any one of an array of outgoing channels. Inherently these devices consist of a multiplicity of optical communications channels that are often implemented on one semiconductor device wafer using micro-machining technology.

A variety of specific structures for optical crossbar switches have been proposed. While many of these rely on non-linear optic materials to obtain switching actions, a very popular way to achieve this end at the time of this application for letters patent is by means of micro-electromechanical structures. These are usually micro-mirror devices that tilt, flex, or flip upon application of an appropriate control voltage.

Most typically, these devices have two states, one of which causes an incoming beam of light to bypass the mirror, by flipping the mirror down or out of the way, and a second position in which the mirror is interposed in the path of the beam so as to reflect it into some or other desired direction in order to couple the optical beam into an output channel, usually via a micro-lens and optical fiber arrangement.

Since one of the very strengths of optical communications is the very wide bandwidth that it makes possible, there is every incentive to ensure that the switching devices are commensurately fast, as this determines the rate at which routing and managed networking of the communication may be achieved.

At the device levels this creates a desire for the reflective elements to have the highest possible natural resonant frequency. While materials choice for the reflective element can help to make this frequency as high as possible, the very size of the mirror structure is core issue. The reflective element needs to be as small as possible.

This requirement presents a problem in that the small apertures involved in the cores of the optical fibers carrying light signals lead to considerable beam divergence, which is typically addressed via micro-lenses to collimate the emerging beam. However, this collimation is also inherently limited by the aforementioned aperture dimensions with the result that it is very difficult to maintain very narrow beam widths across the lateral extent of a multi-channel crossbar switch. The mirrors therefore have to be larger than the beam width in order to reflect most of the incident beam. This requirement for larger mirrors is contrary to the need for high speed switching.

BRIEF SUMMARY OF THE INVENTION

A micro-machined mirror optical crossbar switch directs the light beams of input signal channels to selected output channels by manipulating the focal lengths of adaptive optical elements to ensure that the light beam of any given incoming channel is always focused at the position of the reflective device that is selected to switch that beam. This allows the reflective device to be smaller and switch faster and allows the number of output channels per input channel to be increased.

DETAILED DESCRIPTION OF THE PREFERRED EMBODIMENT

Figure 1:
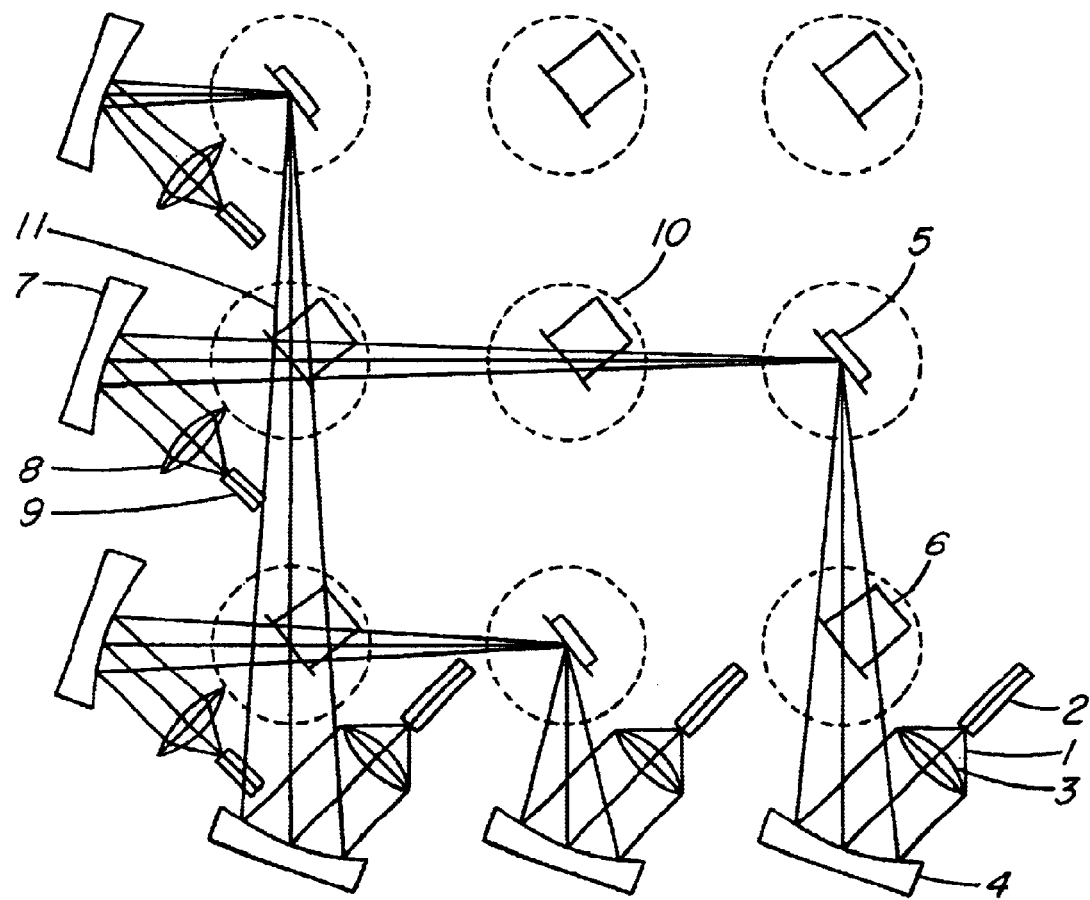
FIG. 1 shows an optical crossbar switch as per the preferred embodiment of the present invention.

FIG. 1 shows the preferred embodiment of the present invention as a 3×3 optical crossbar switch, comprising three input channels along the bottom horizontal and three output channels along the left vertical. The crossbar switch has individually addressable micro-machined mirrors arranged in three rows and three columns with three mirrors in a column per input channel. The invention is particularly useful for larger crossbar switches, from 10×10 to 1000× 1000, however a 3×3 example is shown here for the sake of clarity.

Referring now to FIG. 1, an input signal light beam 1 enters the crossbar switch through the core of optical fiber 2. Due to the very small optical aperture represented by the core of the fiber, the beam 1 has very large divergence as shown in FIG. 1. This divergent light is collected and focused by micro-lens 3. Micro-machined reflective membrane device 4 is employed to adjust the focal point of input signal light beam 1. Such devices are well-known in the art of micromachining and adaptive mirrors and need not be detailed here. They are commercially available from companies such as Flexible Optical B.V. of Delft, the Netherlands.

When mirror 5 is selected in order to direct input signal light beam 1 into output optical fiber 9, micro-machined mirror 5 is flipped into the upright position. In this position it intercepts input signal light beam 1 and reflects it to micro-machined reflective membrane device 7, which is adjusted to refocus the reflected light beam through fixed focal length micro-lens 8, such that the reflected light beam has the appropriate convergence for optimal coupling to optical fiber 9.

In the illustrated embodiment, the micro-machined mirrors are flipped into and out of reflecting positions. it will be clear to those skilled in the art that there is a variety of mechanisms by which these mirrors might be moved to serve the same function, including various forms of rotation and translation. Flipping them up or down has been selected for the preferred embodiment of the present invention because this method is both simple and proven. Optical cross-connects (or crossbar switches) using micromachined mirrors are well-known in the art and need not be detailed here any further. They are commercially available from companies such as Lucent Tecnologies of Murray Hill N.J.

When micro-machined mirror 5 is selected to switch input signal light beam 1, all other micro-machined mirrors 6, 10, and 11 along the path of input signal light beam 1 are flipped down, or out of the way, to ensure that the maximal throughput of input signal light beam 1 is obtained. Micro-machined reflective membrane devices 4 and 7 are adjusted in tandem such that they ensure that input signal light beam 1 is focused on the micro-machined mirror 5 by micro-machined reflective membrane device 4, while micromachined reflective membrane device 7 simultaneously ensures that this reflected light beam is gathered and re-focused such that it couples efficiently to optical fiber 9. Clearly the other two input channels may be directed to the remaining two output channels in the exact same way by two other micro-machined mirrors appropriately selected from the remaining two columns of mirrors in FIG. 1.

When the signal from optical fiber 2 needs to be coupled to an output optical fiber other than optical fiber 9, micro-machined mirror 5 is flipped down and the relevant one of the other two micro-mirrors in the same vertical column in FIG. 1 is flipped into position to intercept input signal light beam 1 such that it may be directed to the intended output optical fiber. Micro-machined reflective membrane device 4 is adjusted to ensure that the focal point of input signal light beam 1 now coincides with the position of the flipped up micro-machined mirror. This focal point will be either closer to or further from micro-machined reflective membrane device 4, depending on which of the other two micro-machined mirrors is selected. At the same time, the output micro-machined reflective membrane device in the same row as the selected micro-machined mirror is adjusted to ensure that the reflected light beam is again focused for optimum coupling to the relevant output optical fiber.

By the method described here any one of the three input micro-machined reflective membrane devices in FIG. 1 may be paired with any one of the three output micro-machined reflective membrane devices and the micro-machined mirror at the intercept of the relevant row and column in FIG. 1, thereby to couple any input channel to any output channel. At the same time the user is assured of the smallest possible light spot size on the micro-machined mirror. As a result the micro-machined mirror needs only to be slightly larger than the focused light spot. The size of this spot is determined by the diameter of the core of optical fiber and the focal length of the combination of micro-lens lens 3 and micro-machined reflective membrane device 4. Ultimately it is limited by the wavelength of the light employed. This much-reduced size of the micro-machined mirror is the source of greatly improved mirror switching speed due to the much-reduced natural oscillation frequency of the mirror.

Since the motion of the mirrored surfaces in devices 4 and 7 are much smaller than the motions of mirrors 5, they do not limit the switching speed. While a mirror 5 typically requires milliseconds to move, mirror 4 can move in microseconds.

Figure 2:
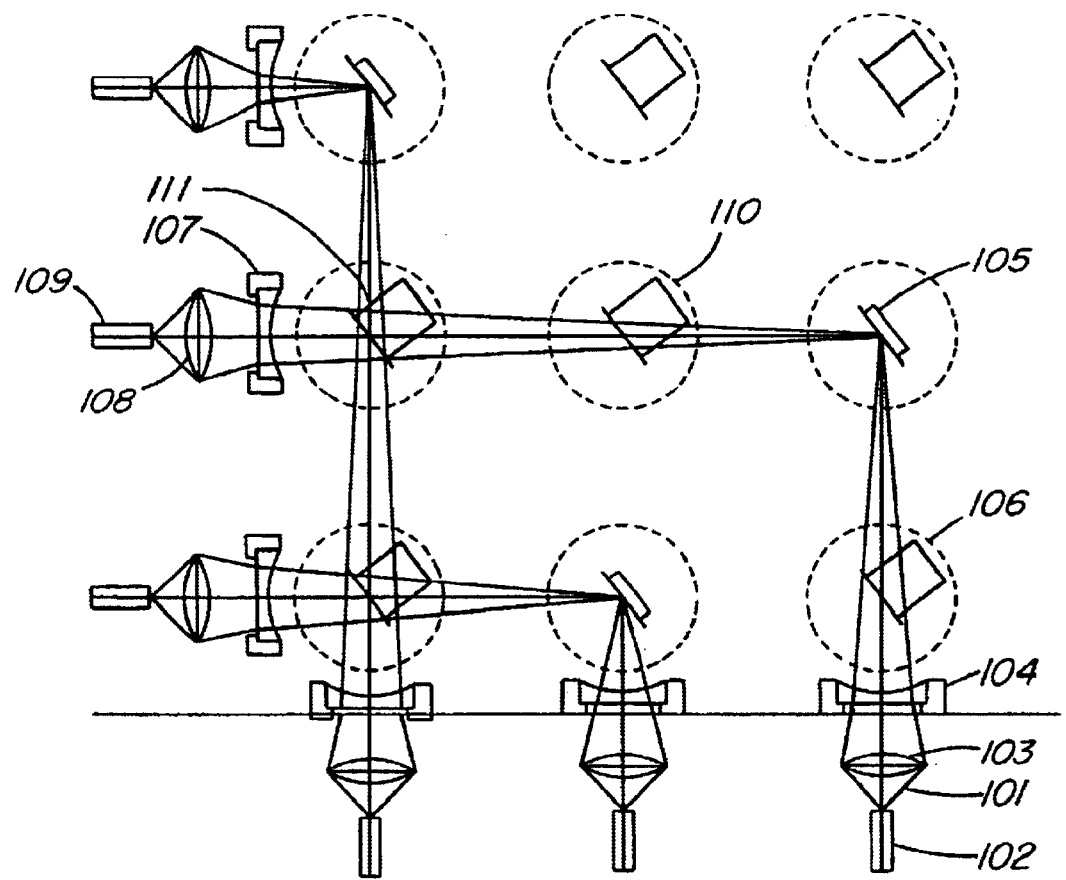
FIG. 2 shows an optical crossbar switch as per an alternative embodiment of the present invention.

In an alternative embodiment of the present invention, shown in FIG. 2, a 3×3 optical crossbar switch comprises three input channels along the bottom horizontal and three output channels along the left vertical. The crossbar switch has individually addressable micro-machined mirrors arranged in three rows and three columns, with three mirrors per column for each input channel.

Referring now to FIG. 2, an input signal light beam 101 enters the crossbar switch through the core of optical fiber 102. Due to the very small optical aperture represented by the core of the fiber, the beam 101 has very large divergence as shown in FIG. 2. This divergent light is collected and focused by micro-lens 103. Micro-machined membrane lens device 104 is employed to adjust the focal point of input signal light beam 101.

When mirror 105 is selected in order to direct input signal light beam 101 into output optical fiber 109, micro-machined mirror 105 is flipped into the upright position. In this position it intercepts input signal light beam 101 and reflects it to micro-machined membrane lens device 107. Micro-machined membrane lens device 107 is adjusted to refocus the reflected light beam through fixed focal length micro-lens 108, such that the reflected light beam has the appropriate convergence for optimal coupling to optical fiber 109.

When micro-machined mirror 105 is selected to switch input signal light beam 101, all other micro-machined mirrors 106, 110, and 111 along the path of input signal light beam 101 are flipped down, or out of the way, to ensure that the maximal throughput of input signal light beam 101 is obtained. Micro-machined membrane lens devices 104 and 107 are adjusted in tandem such that they ensure that input signal light beam 101 is focused on the micro-machined mirror 105 by micro-machined membrane lens device 104 while micro-machined membrane lens device 107 simultaneously ensures that this reflected light beam is gathered and re-focused such that it couples efficiently to optical fiber 109. Clearly, the other two input channels may be directed to the remaining two output channels in the exact same way by two other micro-machined mirrors appropriately selected from the remaining two columns of mirrors in FIG. 2.

When the signal from optical fiber 102 needs to be coupled to an output optical fiber other than optical fiber 109, micro-machined mirror 105 is flipped down and the appropriate micro-mirror, located in the same vertical column, is flipped into position, intercepting input signal light beam 101 such that it may be directed to the intended output optical fiber. Micro-machined membrane lens device 104 is adjusted to ensure that the focal point of input signal light beam 101 now coincides with the position of the selected micro-machined mirror. This focal point will be either closer to or further from micro-machined membrane lens device 104, depending on which of the other two micro-machined mirrors is selected. At the same time, the output micro-machined reflective membrane device in the same row as the selected micro-machined mirror is adjusted to ensure that the reflected light beam is again focused for optimum coupling to the relevant output optical fiber.

By the method described here any one of the three input micro-machined membrane lens devices in FIG. 2 may be teamed with any one of the three output micro-machined membrane lens devices using the micro-machined mirror at the intercept of the relevant row and column in FIG. 2, thereby allowing the coupling of any input channel to any output channel. At the same time the user is assured of the smallest possible light spot size on the micro-machined mirror. As a result the micro-machined mirror needs only to be slightly larger than the focused light spot. The size of this spot is determined by the diameter of the core of optical fiber and the focal length of the combination of micro-lens 103 and micro-machined reflective membrane device 104. Ultimately it is limited by the wavelength of the light employed. This much-reduced size of the micro-machined mirror is the source of greatly improved mirror switching speed due to the much-reduced natural oscillation frequency of the mirror.

In order for the 3×3 crossbar-switch of FIG. 2 to optimally exploit this improved micro-mirror switching speed, the micro-machined membrane lens devices 104 and 107 must also switch at correspondingly high speeds. To this end, they are fabricated using micro-machining, and are themselves micro-miniaturized in order to maximize their speed.

In the case of both the preferred and alternative embodiments shown in FIG. 1 and FIG. 2 respectively, membrane devices comprising stressed circular membranes attached to a substrate by their perimeter, are preferred over unstressed membranes, as the stressed configuration is conducive to high-speed operation of the devices. Both embodiments also may be implemented using position feedback systems.

In a more general case, the mirrors are not micro-machined and are not part of monolithic arrays, but are rather fabricated as discrete devices and the micro-machined reflective membrane devices and micro-machined membrane lenses are also discrete devices or individually fabricated. In this respect, it is also possible to use liquid crystal lenses. In this application for letters patent, we refer to the generalized focusing device employed in this way in the present invention as an adaptive optical element. The adaptive optical elements employed in the present invention may therefore, in particular but not exclusively, be variable mirror devices or variable lens devices. The general requirement is that their focal length be adjustable. In the general case, the reflective devices performing the actual switching of the input channel light beam are referred to as selectable reflective optical elements.

All of these different embodiments may also be extended to crossbar switches where the number of input channels is not necessarily equal to the number of output channels.

Since, by virtue of the present innovation, the input light beam reflected by a selected mirror is always focused on that particular mirror, the problems of collimation over comparatively long distances that are experienced with prior art crossbar switches do not apply. The number of channels of the crossbar switch may therefore be increased. This is limited only by the range over which the variable membrane devices may be focused.

There has thus been outlined the important features of the invention in order that it may be better understood, and in order that the present contribution to the art may be better appreciated. Those skilled in the art will appreciate that the conception on which this disclosure is based may readily be utilized as a basis for the design of other apparatus for carrying out the several purposes of the invention. It is most important, therefore, that this disclosure be regarded as including such equivalent apparatus as do not depart from the spirit and scope of the invention.

What is claimed is:

1. A method for operating an optical crossbar switch having a plurality of selectable reflective optical switching elements, said method comprising:
   focusing a selected input light beam on a first selected reflective optical switching element, the first selected reflective optical switching element directing the selected input light beam to a first output;
   selecting a second reflective optical switching element; and,
   varying a focus of said selected input light beam to focus said selected input light beam on said second selected reflective optical switching element, the second selected reflective optical element directing the selected input light beam to a second output.

2. A method as in claim 1, wherein said focusing comprises varying a focal length of an adaptive optical element.

3. A method as in claim 2 wherein said adaptive optical element comprises a variable mirror device.

4. A method as in claim 2 wherein said adaptive optical element comprises a variable lens.

5. A method as in claim 4 wherein said variable lens comprises a variable micro-machined membrane lens.

6. An optical crossbar switch for switching input light beams, the switch comprising;
   at least one adaptive optical element having a focal length variable over a range, the adaptive optical element located in a path of a selected input light beam; and,
   a plurality of selectable reflective optical elements, said selectable reflective optical elements alternatively selectable and interposable in the path of the selected input light beam to direct the selected input light beam to a corresponding one of a plurality of outputs;
   wherein more than one of said selectable reflective optical elements are located within the range over which said adaptive optical element is capable of focusing said selected input light beam.

7. An optical crossbar switch as in claim 6, wherein said adaptive optical element comprises a variable mirror device.

8. An optical crossbar switch as in claim 6, wherein said adaptive optical element comprises a variable lens.

9. An optical crossbar switch as in claim 8 wherein said variable lens comprises a variable micro-machined membrane lens.

10. An apparatus for directing an optical signal from an input channel to a selected one of a plurality of output channels, the apparatus comprising:
    a plurality of individually switchable reflective elements located to intercept an optical signal from the input channel, the plurality of reflective elements having a plurality of selectable configurations, each of the configurations directing the optical signal to a corresponding one of the output channels, in each of the configurations the optical signal incident on a selected one of the reflective elements; and,
    at least one adjustable focus optical element in an optical path between the input channel and the plurality of reflective elements, the at least one adjustable focus optical element configured to focus the optical signal onto a currently selected one of the reflective elements and, upon a different one of the reflective elements becoming the currently selected one of the reflective elements, to vary a focus of the adjustable focus optical element to focus the optical signal onto the different one of the reflective elements.

11. An apparatus according to claim 10, wherein each of the plurality of reflective elements corresponds to one of the plurality of output channels and in each of the configurations the selected one of the reflective elements is the reflective element corresponding to the corresponding output channel.

12. An apparatus according to claim 11 wherein each of the plurality of individually switchable reflective elements is moveable between a reflective state and a non-reflective state.

13. An apparatus according to claim 12, wherein each of the plurality of individually switchable reflective elements comprises a member movable between a substantially flat orientation and a substantially upright orientation and when the reflective element is in its reflecting state, the element is in its substantially upright orientation.

14. An apparatus according to claim 10, wherein each of the plurality of individually switchable reflective elements comprises a micro-machined mirror.

15. An apparatus according to claim 10, wherein the adjustable focus optical element comprises one of: an adjustable focus reflective element and an adjustable focus transmissive element.

16. An apparatus according to any one of claims 10, 11 or 13 comprising a plurality of second adjustable focus optical elements each located in an optical path between the plurality of reflective elements and a corresponding one of the output channels.

17. An apparatus according to claim 16 comprising a plurality of collimating lenses, each of the collimating lenses disposed in an optical path between one of the plurality of second adjustable focus optical elements and a corresponding output channel.

18. An apparatus according to any one of claims 10, 11 or 13 comprising a collimating lens disposed between the input channel and the at least one adjustable focus optical element.

19. An apparatus according to claim 10 wherein the input channel comprises an optical fiber.

20. An apparatus according to claim 10 wherein the plurality of individually switchable reflective elements comprises a linear array of micro-machined mirrors.

21. An apparatus according to claim 20 comprising a plurality of input channels wherein the plurality of individually switchable reflective elements comprises a plurality of linear arrays of micro-machined mirrors, the plurality of linear arrays including a mirror corresponding to each possible combination of one of the input channels and one of the output channels.

22. An apparatus according to claim 10, wherein the adjustable focus optical element comprises a liquid crystal lens.

23. A switch for switching optical signals comprising:
a plurality of optical input channels and a plurality of optical output channels;
a plurality of individually switchable reflective elements, each of which is switchable between a reflecting state and a non-reflecting state; and
a plurality of adjustable focus optical elements, each of the adjustable focus optical elements in an optical path between a corresponding one of the input optical channels and the plurality of individually switchable reflective elements, each of the adjustable focus optical elements capable of focusing an optical signal from the corresponding one of the input channels onto any one of a plurality of the plurality of individually switchable reflective elements, each of the plurality of the plurality of individually switchable reflective elements located to require a different focus setting of the adjustable focus optical element;
wherein an optical signal may be directed from a selected one of the input optical channels to a selected one of the output optical channels by switching a selected one of the plurality of reflective elements to its reflecting state and adjusting a focus of the at least one adjustable focus optical element corresponding to the selected input optical channel to focus the optical signal onto the selected reflective element.

24. A method for directing an optical signal from an input channel to a selected one of a plurality of output channels, the method comprising:
actuating a reflective element to direct an optical signal from the input channel to a selected one of the output channels; and,
operating an adjustable focus optical element to focus the optical signal from the input channel onto the reflective element.

25. A method according to claim 24, wherein actuating the reflective element comprises moving the reflective element between a position wherein the reflective element is in a non-reflecting state and a position wherein the reflective element is in a reflecting state.

26. A method according to claim 25, wherein actuating the reflective element comprises flipping the reflective element from a substantially flat orientation to a substantially upright orientation.

27. A method according to claim 24, wherein the reflective element comprises a micro-machined mirror.

28. A method according to any one of claims 24 or 25 comprising providing a second adjustable focus optical element in an optical path between the reflective element and the selected one of the output channels and adjusting a focal length of the second adjustable focus optical element to couple the optical signal to the selected one of the output channels.

29. The method of claim 24 comprising switching the optical signal from the selected one of the output channels to a different one of the output channels by:
deactivating the reflective element and activating a different reflective element; and,
adjusting the adjustable focus optical element to focus the optical signal onto the different reflective element.

30. A method according to claim 29, wherein activating the different reflective element comprises switching the different reflective element from a non-reflecting state to a reflecting state.

31. A method for directing an optical signal from a selected one of a plurality of input channels to a selected one of a plurality of output channels comprising:
actuating a reflective element corresponding to the selected input and output channels; and,
altering a focus of an optical signal from the selected input channel to focus the optical signal onto the actuated reflective element.

32. The method of claim 31 wherein altering the focus of the optical signal comprises adjusting a variable focus optical element disposed in an optical path between the selected input channel and the reflective element.

33. The method of claim 31 comprising adjusting a second variable focus optical element disposed in an optical path between the reflective element and the selected output channel to couple the optical signal to the selected output channel.

34. A method for redirecting a radiation beam in an optical crossbar switch comprising a plurality of individually selectable reflective optical switching elements, the method comprising:
focusing a selected radiation beam on a first selected reflective optical switching element;
selecting a second reflective optical switching element; and,
focusing the selected radiation beam on the second reflective optical switching element.

* * * * *